Dec. 29, 1964 E. S. OELKE ETAL Re. 25,705

VALVING ARRANGEMENT FOR ROCK DRILLS

Original Filed Feb. 27, 1961

INVENTORS
ERWIN S. OELKE
EWALD H. KURT
BY
Daniel W. Tilghman
THEIR ATTORNEY

United States Patent Office

Re. 25,705
Reissued Dec. 29, 1964

25,705

VALVING ARRANGEMENT FOR ROCK DRILLS

Erwin S. Oelke, Easton, Pa., and Ewald H. Kurt, Phillipsburg, N.J., by Ingersoll-Rand Company, a corporation of New Jersey Original No. 3,078,827, dated Feb. 26, 1963, Ser. No. 92,023, Feb. 27, 1961. Application for reissue Mar. 5, 1964, Ser. No. 360,788
17 Claims. (Cl. 173—73)

Figure 1:
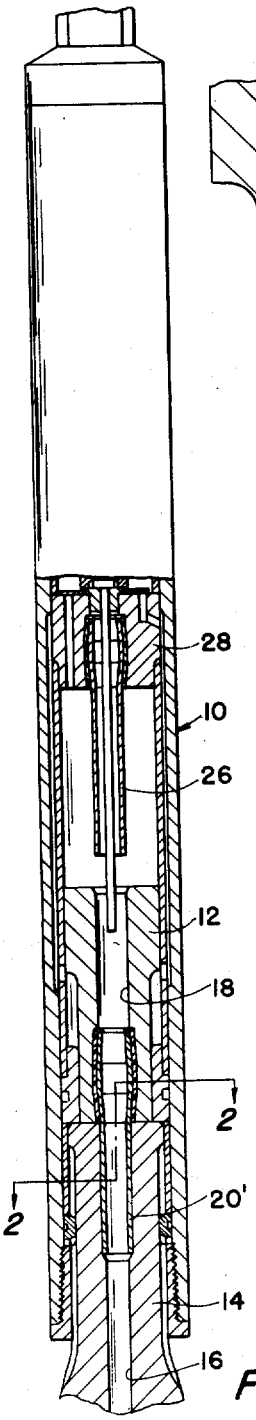

Matter enclosed in heavy brackets [ ] appears in the original patent but forms no part of this reissue specification; matter printed in italics indicates the additions made by reissue.

This invention relates to rock drills in general and more in particular to that type of rock drill commonly known as down-hole drills. *This is a reissue application of U.S. Patent No. 3,078,827, issued to E. S. Oelke et al., on February 26, 1963.*

The type of drill referred to is built to operate at great depths to cut large quantities of material. Such material, for commonly known reasons, has to be removed from the hole being drilled, and usually, removal of the cuttings is achieved by conducting compressed air through the drill and into the hole being drilled in order to blow out the cuttings from such hole.

In general, the present type rock drills are adapted such that the exhaust of the drill is conducted through an axial passage in the cutting implement or drill bit of the rock drill, the admittance of such exhaust into the drill bit passage being controlled by means of cooperation between the piston and two valving arrangements. One valving arrangement is positioned forwardly of the piston while the other valving arrangement is positioned rearwardly of the piston. Both valving arrangements are disclosed in patent application, Serial No. 33,059, filed May 31, 1960, *now Patent No. 3,085,555,* while the valving arrangement rearwardly of the piston is also disclosed in U.S. Patent No. 2,951,467. These valving arrangements include a tube connected to the drill bit, and a tube connected to the valve cage, providing telescoping communication during a part of each stroke of the piston between the associated tube and an axial passage in the piston. With the latter arrangement a portion of the exhaust of the rock drill is valved into the drill bit passage and into the hole being drilled. As the drill bit is subjected to a high frequency of heavy impacts, one of the problems is to provide a durable and effective connection between the tube and the drill bit, a connection which can withstand the impacts of the piston and consequent severe vibration and stresses thereof. Another problem is to have the tube connected to either the piston, the drill bit, or the valve cage.

Accordingly, an object of this invention is to provide a rock drill having an effective conductance of fluid for cleansing the hole being drilled.

Another object of this invention is to provide a rock drill having an improved construction, compared to presently known types of rock drills, to achieve effective and reliable means for the conductance and valving of fluid for cleansing the hole being drilled.

Other objects will be in part pointed out and in part obvious hereinafter.

Figure 3:
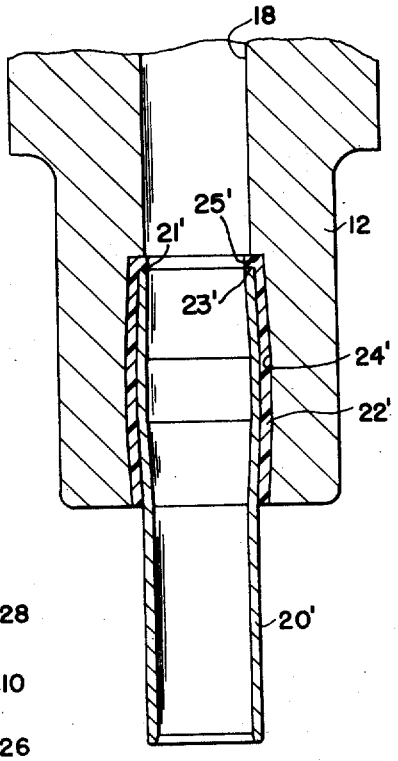
Figure 4:
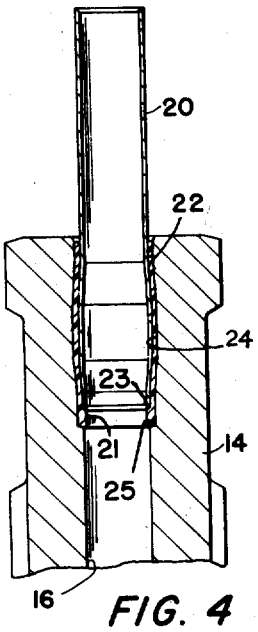
Figure 6:
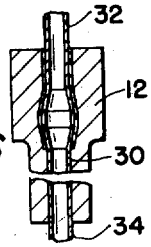
Figure 2:
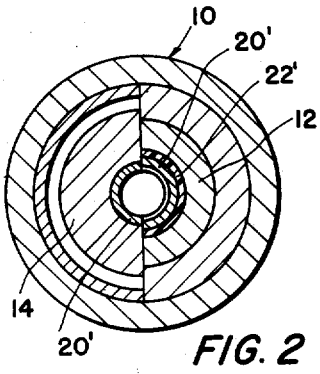
Figure 5:
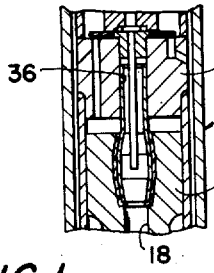

Referring to the drawings,

FIGURE 1 shows a rock drill with a drill bit (partly shown) connected thereto, partly in longitudinal section, FIG. 2 is a cross section taken along the line 2—2 of FIG. 1 looking in the direction of the arrows, FIG. 3 is a longitudinal section of a part of the piston shown in FIG. 1 showing enlarged the connection between a tube and the forward end portion of the piston, FIG. 4 is a longitudinal section of a part of the drill bit shown in FIG. 1 showing enlarged the connection between a tube and the drill bit, FIG. 5 is a longitudinal section of a part of the piston shown in FIG. 1 showing the connection between a tube and the rear end portion of the piston, and FIG. 6 is a longitudinal section of the piston shown in FIG. 1 showing a tube connected to the piston such that the tube extends from both ends of the piston.

Referring now to FIG. 1, the rock drill shown comprises a casing 10, partly shown in section, within which is disposed a reciprocatory piston 12 adapted to be actuated to strike a drill bit 14, partly shown, extending into the forward end portion of casing 10. Drill bit 14 is provided with an axial passage 16 through which fluid is conducted for cleansing the hole being drilled, not shown. Piston 12 is also provided with an axial passage 18 through which fluid is conducted to passage 16 of drill bit 14 for cleansing the hole being drilled.

The aforementioned cleansing fluid includes the exhaust of spent motive fluid from within the casing, the control of the flow of such exhaust being controlled by a tube 20 connected to drill [hit] *bit* 14, see FIG. 4. Tube 20 is adapted to have a running fit with passage 18 of piston 12. As the tube arrangement shown in FIG. 14 is an improvement of the tube arrangement shown in patent application Serial No. 33,059, filed May 31, 1960, reference is made to the aforementioned patent application for the structure and the operation of the rock drill including the tube controlling means.

Referring to the valving arrangements according to this invention, one arrangement is shown in FIGS. 1–4. The tube, preferably of an aluminum alloy, is resiliently connected to either piston 12 or to drill bit 14, such connection being made by expanding a portion of the tube against resilient means in either the piston or the drill bit to effect resilient transmission of motion between the tube and either the piston or the drill bit, as to be described hereinafter.

Referring now to FIG. 4, the upper end portion of passage 16 in drill bit 14 is *diametrically* enlarged such that there is provided a passage portion or *diametrically enlarged portion* 24 having varied cross sectional areas [.] *and a shoulder 25 interconnecting the wall surface of the enlarged portion 24 with the remainder of the passage 16.* When the lower end portion of tube 20 is inserted in its original form (of uniform diameter such as the upper end portion of tube 20) into such enlarged portion 24 of passage 16, there is created a substantial clearance between the outer periphery of tube 20 and the inner periphery of passage portion 24. In the aforementioned clearance is then disposed a sleeve member *22* of resilient material, preferably polyurethane, and, when the lower end portion of the tube is expanded by a predetermined force towards the inner periphery of passage 24, the resilient material of sleeve 22 is compressed to a predetermined degree. *The expansion of* [As] tube 20 [is expanded] into a form as shown in FIG. 4 [, tube 20 is prevented] *aids in preventing it* from being moved out of the associated portion of passage 16 of drill bit 14. This arrangement creates a connection between tube 20 and drill bit 14 which is strong, resilient and capable of withstanding the shocks of the impacts delivered by piston 12 to drill bit 14. In this manner the transmission of motion from the drill bit to the tube is substantially cushioned, providing a tube connection which is stronger and more durable when compared to the presently known connections.

*The inner end edge of the resilient sleeve 22 seats against the shoulder 25 on the inner wall of the passage 16 to prevent the sleeve 22 from moving farther into the passage 16 during use of the bit 14. If the shoulder 25 is omitted, the sleeve 22 is likely to "walk" deeper into*

*the bit 14 from the repeated impact shocks delivered to the bit 14. Likewise, the inner end of the sleeve 22 is provided with an inwardly projecting flange 21 forming an annular shoulder 23 engaging the inner end edge of the conduit or tube 20. The shoulder 23 and engaged end edge of the tube 20 lie in planes extending substantially transverse to the axis of the passage 16 and prevent the tube 20 from moving farther into the passage 16 relative to the sleeve 22.*

The connection of tube 20' to piston 12 is illustrated in FIG. 3, such connection being achieved by expanding the upper end portion of tube 20' against resilient sleeve member 22' and towards the inner periphery of passage 24', in the same manner as described hereinbefore in connection with the tube connection with drill bit 14. It is to be noted that when the tube is connected to piston 12, as shown in FIG. 1 and FIG. 3, when piston 12 moves away from drill bit 14 after having struck drill bit 14, the forward end portion of tube 20' withdraws from passage 16 in drill bit 14. Pressure fluid in the front end of the casing then escapes through passage 16 of drill bit 14, and therefrom into the hole being drilled, such operation being similar to the operation of the tube when connected to the drill bit as described in detail in the aforementioned patent application.

In presently known rock drills valving of the spent motive fluid from the space rearwardly of piston 12 is achieved by cooperation between piston 12 and a tube 26 which is connected to a valve cage 28, see FIG. 1, such valving being disclosed in the aforementioned patent applications. According to this invention, the tube is connected to either the valve cage 28, see FIG. 1, or to piston 12, see FIG. 5, the connection between the tube and either the valve cage or the piston being achieved in the same manner as described hereinbefore in connection with the tube connection with either the drill bit or the forward end portion of the piston.

Referring now to FIG. 6, there is shown still another valving arrangement, a tube 30 connected to piston 12 such that a portion 32 of tube 30 extends rearwardly of piston 12 while a portion 34 of tube 30 extends forwardly of piston 12. The connection of tube 30 to piston 12 is achieved in the same manner as described hereinbefore. Valving of the exhaust from the spaces forwardly and rearwardly of piston 12, when applying the tube arrangement as shown in FIG. 6, is achieved by providing a passage 36 in valve cage 28 adapted to have a running fit with portion 32 of tube 30, portion 34 of tube 30 having a running fit with passage 16 of drill bit 14. When piston 12 is actuated away from drill bit 14 after having struck drill bit 14, portion 34 of tube 30 withdraws from passage 16 of drill bit 14. Spent motive fluid forwardly of piston 12 then escapes through passage 16 of drill bit 14, and therefrom into the hole being drilled. When piston 12 is actuated away from valve cage 28, portion 32 of tube 30 withdraws from passage 36 of valve cage 28, and spent motive fluid rearwardly of piston 12 then escapes through tube 30 of piston 12 and therefrom into passage 16 of drill bit 14 and into the hole being drilled.

It is to be noted that the tube connections according to this invention, as achieved by using a resilient material between the outer periphery of the associated tube portion and the inner periphery of the associated passage in either the piston, the drill bit, or the valve cage, avoids direct contact between the tube and the member to which it is connected, such connection usually causing excessive wear of both members and more in particular of the member made of the softer material. The tube connections according to this invention also effects a resilient transmission of the impacts from either the piston or the drill bit to the tube, providing a durable and reliable structure.

Where there is shown and described specific forms of this invention, it is to be understood that various changes and modifications may be made without departing from the spirit of the invention as set forth in the appended claims.

We claim:

1. In a rock drilling device comprising a casing and a reciprocatory first member in said casing, means to conduct fluid to actuate said first member, a second member extending into said casing positioned to be struck by said first member, said first member provided with an axial first passage to conduct fluid therethrough, said second member provided with an axial second passage to receive fluid conducted through said first passage, and conduit means resiliently connected to communicate with and to extend from the passage of one of said members positioned and adapted to telescopingly communicate with the passage of the other of said members during at least a part of each stroke of the other of said members.

2. In a rock drilling device comprising a casing and a reciprocatory first member in said casing, means to conduct fluid to actuate said first member, a second member extending into said casing positioned to be struck by said first member, said first member provided with an axial first passage to conduit fluid therethrough, said second member provided with an axial second passage to receive fluid conducted through said first passage, and a conduit resiliently connected to communicate with and to extend from the passage of said first member positioned and adapted to telescopingly communicate with said second passage in said second member during at least a part of each stroke of said first member.

3. In a rock drilling device comprising a casing and a reciprocatory first member in said casing, means to conduct fluid to actuate said first member, a second member extending into said casing positioned to be struck by said first member to reciprocate whenever such rock drill is operating, said first member provided with an axial first passage to conduct fluid therethrough, said second member provided with an axial second passage to receive fluid conducted through said first passage, and a conduit resiliently connected to communicate with and to extend from the passage of said second member positioned and adapted to telescopingly communicate with said first passage in said first member during at least a part of each stroke of said second member.

4. A movable cutting implement for a rock drilling device provided with a fluid passage therethrough, a conduit having one end portion disposed in said passage and extending exteriorly of said implement to conduct fluid, resilient means positioned between the inner periphery of said passage and the outer periphery of said end portion of said conduit to resiliently transmit motion from said implement to said conduit whenever said implement is moved, said one end portion of said conduit being expanded toward the inner periphery of said passage to prevent withdrawal of the conduit from said passage.

5. A movable cutting implement for a rock drilling device having a fluid passage therethrough, a portion of said passage having an area with an irregular surface, a conduit having one end disposed in said passage and coextensive with at least a part of such area and extending exteriorly of said implement to conduct fluid, and resilient means positioned between the inner periphery of said passage and the outer periphery of said conduit at such area to resiliently transmit motion from said implement to said conduit whenever said implement is moved, said conduit being expanded at said areas to prevent withdrawal of the conduit from said passage.

6. A movable cutting implement for a rock drilling device having a fluid passage therethrough, a portion of said passage having varied cross sectional areas, a conduit having one end disposed in said passage and coextensive with at least a part of such areas and extending exteriorly of said implement to conduct fluid, and resilient means positioned between the inner periphery of said passage and the outer periphery of said conduit at at least a part of such areas to resiliently transmit motion from said implement to said conduit whenever said implement is moved, said conduit being expanded at the last said areas to prevent withdrawal of the conduit from said passage.

7. In a rock drilling device comprising a casing and means to conduct pressure fluid for operating such rock drilling device, a reciprocatory first member in said casing to be actuated by such pressure fluid, a second member extending into the forward end portion of said casing positioned to be struck by said first member, a third member positioned rearwardly of said first member adapted to conduct pressure fluid for actuating said first member, each of said members provided with a longitudinal passage for the conductance of fluid, and conduit means resiliently connected to at least one of said members adapted to cooperate with the passage of one of the other members to valve fluid during at least a part of each stroke of said first member from interiorly of said casing to exteriorly thereof.

8. A movable piston for a rock drilling device having a fluid passage therethrough, a portion of said passage having varied cross sectional areas, a conduit in said passage having one end portion extending from one end of said piston and the other end portion of said conduit extending from the other end of said piston to conduct fluid, resilient means positioned between the inner periphery of said passage and the outer periphery of said conduit at at least a part of such areas to resiliently transmit motion from said piston to said conduit whenever said piston is moved, said conduit being expanded at said areas to prevent withdrawal of said conduit from said passage.

9. In a rock drilling device comprising a casing and means to conduct pressure fluid for operating such rock drilling device, a reciprocatory first member in said casing to be actuated by such pressure fluid, a second member extending into the forward end portion of said casing positioned to be struck by said first member, a third member positioned rearwardly of said first member adapted to conduct pressure fluid for actuating said first member, each of said members provided with a longitudinal passage for the conductance of fluid, a conduit connected to at least one of said members adapted to cooperate with the passage of one of the other members to valve fluid during at least a part of each stroke of said first member from the interior of said casing to exteriorly thereof, resilient means positioned between the inner periphery of the passage in the member to which the said conduit is connected and the outer periphery of said conduit, said conduit being expanded at such area of positioning of said resilient means to resiliently hold said conduit against movement of said conduit relative to the member to which said conduit is connected.

10. In a rock drilling device comprising a casing and a reciprocatory first member in said casing, a second member positioned rearwardly of said first member adapted to conduct pressure fluid for actuating said first member, said first member provided with an axial first passage to conduct fluid therethrough, said second member provided with an axial second passage to conduct fluid therethrough, and conduit means resiliently connected to communicate with and to extend from the passage of one of said members positioned and adapted to cooperate with the passage of the other of said members during at least a part of each stroke of said first member.

11. In a rock drilling device comprising a casing and a reciprocatory first member in said casing, a second member positioned rearwardly of said first member adapted to conduct pressure fluid for actuating said first member, said first member provided with an axial first passage to conduct fluid therethrough, said second member provided with an axial second passage to conduct fluid therethrough, and a conduit resiliently connected to communicate with and to extend from the passage of said first member positioned and adapted to telescopingly communicate with said second passage in said second member during at least part of each stroke of said first member.

12. In a rock drilling device comprising a casing and a reciprocatory first member in said casing, a second member positioned rearwardly of said first member adapted to conduct pressure fluid for actuating said first member, said first member provided with an axial first passage to conduct fluid therethrough, said second member provided with an axial second passage to conduct fluid therethrough, and a conduit resiliently connected to communicate with and to extend from the passage of said second member positioned and adapted to telescopingly communicate with said first passage in said first member during at least a part of each stroke of said first member.

*13. A movable cutting implement for a rock drilling device provided with a fluid passage therethrough, said passage having an end portion which is diametrically enlarged relative to the remainder of said passage and forming a first shoulder located in said passage at the junction of said diametrically enlarged end portion and the remainder of said passage, a conduit having one end portion disposed in the diametrically enlarged end portion of said passage and extending exteriorly of said implement to conduct fluid, resilient means positioned between the inner periphery of said passage and the outer periphery of said end portion of said conduit to resiliently transmit motion from said implement to said conduit whenever said implement is moved, said resilient means being a sleeve surrounding said one end portion of said conduit to support said conduit in spaced relationship to said implement and engaging said first shoulder to prevent said sleeve from moving farther into said implement, and said one end portion of said conduit being expanded toward the inner periphery of said passage to prevent withdrawal of the conduit from said passage.*

*14. A movable cutting implement for a rock drilling device provided with a fluid passage therethrough, a first shoulder located in said passage intermediate its ends, a conduit having one end portion disposed in said passage and extending exteriorly of said implement to conduct fluid, resilient means positioned between the inner periphery of said passage and the outer periphery of said end portion of said conduit to resiliently transmit motion from said implement to said conduit whenever said implement is moved, said resilient means being a sleeve surrounding said one end portion of said conduit to support said conduit in spaced relationship in said implement and engaging said shoulder to prevent said sleeve from moving farther into said implement, and said one end potrion of said conduit being expanded toward the inner periphery of said passage to prevent withdrawal of the conduit from said passage.*

*15. A movable cutting implement for a rock drilling device provided with a fluid passage therethrough, a first shoulder located in said passage intermediate its ends, a conduit having one end portion disposed in said passage and extending exteriorly of said implement to conduct fluid, resilient means positioned between the inner periphery of said passage and the outer periphery of said end portion of said conduit to resiliently transmit motion from said implement to said conduit whenever said implement is moved, said resilient means being a sleeve surrounding said one end portion of said conduit to support said conduit in spaced relationship in said implement and engaging said shoulder to prevent said sleeve from moving farther into said implement, said one end portion of said conduit being expanded toward the inner periphery of said passage to prevent withdrawal of the conduit from said passage, and said conduit and said sleeve having interengaged surfaces lying in planes extending substantially transverse to the axis of said passage for preventing said conduit from moving farther into said implement relative to said sleeve.*

*16. A movable cutting implement for a rock drilling device provided with a fluid passage therethrough, a first*

*shoulder located in said passage intermediate its ends, a conduit having one end portion disposed in said passage and extending exteriorly of said implement to conduct fluid, resilient means positioned between the inner periphery of said passage and the outer periphery of said end portion of said conduit to resiliently transmit motion from said implement to said conduit whenever said implement is moved, said resilient means being a sleeve surrounding said one end portion of said conduit to support said conduit in spaced relationship in said implement and engaging said shoulder to prevent said sleeve from moving farther into said implement, said one end portion of said conduit being expanded toward the inner periphery of said passage to prevent withdrawal of the conduit from said passage, said conduit and said sleeve having interengaged surfaces lying in planes extending substantially transverse to the axis of said passage for preventing said conduit from moving farther into said implement relative to said sleeve, and said engaged surfaces including an inwardly extending second shoulder on said sleeve engaging an end edge of said conduit.*

*17. A movable cutting implement for a rock drilling device provided with a fluid passage therethrough, said passage having an end portion which is diametrically enlarged relative to the remainder of said passage and forming a first shoulder located in said passage at the junction of said diametrically enlarged end portion and the remainder of said passage, a conduit having one end portion disposed in the diametrically enlarged end portion of said passage and extending exteriorly of said implement to conduct fluid, resilient means positioned between the inner periphery of said passage and the outer periphery of*

*said end portion of said conduit to resiliently transmit motion from said implement to said conduit whenever said implement is moved, said resilient means being a sleeve surrounding said one end portion of said conduit to support said conduit in spaced relationship to said implement and engaging said first shoulder to prevent said sleeve from moving farther into said implement, said one end portion of said conduit being expanded toward the inner periphery of said passage to prevent withdrawal of the conduit from said passage, said conduit and said sleeve having interengaged surfaces lying in planes extending substantially transverse to the axis of said passage for preventing said conduit from moving farther into said implement relative to said sleeve, and said engaged surfaces including an inwardly extending second shoulder on said sleeve engaging an end edge of said conduit.*

References Cited by the Examiner

The following references, cited by the Examiner, are of record in the patented file of this patent or the original patent.

UNITED STATES PATENTS

| | | | |
|---|---|---|---|
| 1,540,910 | 6/25 | Smith. | |
| 2,725,214 | 11/55 | Lofqvist. | |
| 2,859,733 | 11/58 | Bassinger et al. | |
| 2,916,816 | 12/59 | Black et al. | 285—258 |
| 2,947,519 | 8/60 | Feucht. | |
| 2,951,467 | 9/60 | Morrison. | |
| 2,979,033 | 4/61 | Bassinger. | |
| 3,057,417 | 10/62 | Sandvig | 173—78 |

BROUGHTON G. DURHAM, *Primary Examiner.*